United States Patent
Contet

(10) Patent No.: US 7,637,309 B2
(45) Date of Patent: Dec. 29, 2009

(54) COOLING MODULE WITH HEAT EXCHANGERS IN BACK-TO-FRONT RELATIONSHIP

(75) Inventor: Arnaud Contet, Sölvesborg (SE)

(73) Assignee: Titanx Engine Cooling Holding AB, Sölvesborg (SE)

( * ) Notice: Subject to any disclaimer, the term of this patent is extended or adjusted under 35 U.S.C. 154(b) by 10 days.

(21) Appl. No.: 11/595,648

(22) Filed: Nov. 9, 2006

(65) Prior Publication Data

US 2007/0119564 A1  May 31, 2007

(30) Foreign Application Priority Data

Nov. 30, 2005  (SE) .................................... 0502621

(51) Int. Cl.
*F28F 9/02*   (2006.01)
(52) U.S. Cl. .................... 165/67; 165/153; 165/175
(58) Field of Classification Search .................. 165/67, 165/140, 148, 149, 152, 153, 173, 175; 180/68.4
See application file for complete search history.

(56) References Cited

U.S. PATENT DOCUMENTS

| | | | | |
|---|---|---|---|---|
| 4,651,816 A | * | 3/1987 | Struss et al. .................. | 165/76 |
| 5,269,367 A | * | 12/1993 | Susa et al. ..................... | 165/41 |
| 5,785,115 A | * | 7/1998 | Laveran ........................ | 165/67 |
| 5,996,684 A | * | 12/1999 | Clifton et al. ................. | 165/67 |
| 6,250,381 B1 | * | 6/2001 | Nishishita .................... | 165/175 |
| 6,513,579 B1 | * | 2/2003 | Kent et al. .................... | 165/67 |
| 2002/0157812 A1 | * | 10/2002 | Anderson et al. ............. | 165/67 |
| 2006/0090878 A1 | * | 5/2006 | Levasseur et al. ............. | 165/67 |

FOREIGN PATENT DOCUMENTS

| | | | |
|---|---|---|---|
| JP | 2005-188799 | * | 7/2005 |
| WO | WO 2004/005830 | * | 1/2004 |

\* cited by examiner

*Primary Examiner*—Teresa J Walberg
(74) *Attorney, Agent, or Firm*—Howard & Howard Attorneys PLLC

(57) ABSTRACT

A cooling module (1) comprises a first heat exchanger (3), which has a first pair of parallel manifolds (10, 11), and a second heat exchanger (4), which is in back-to-front relationship with the first heat exchanger (3) and has a second pair of parallel manifolds (7, 8) perpendicular to the first pair of manifolds (10, 11). The first pair of manifolds (10, 11) is fastened to the second pair of manifolds (7, 8) at four corners (13, 14, 15, 16) by means of four fasteners, of which the first is a rigid fastener (19), the second (20) and third (22) are two-way fasteners, and the fourth (27) is a four-way fastener. The four-way fastener (27) is situated at the corner (16) diametrically opposed to the corner (13) with the rigid faster (19), and the two-way fasteners (20, 22) are situated at one of the remaining corners (14, 15) each. The two-ways fasteners (20, 22) allow mutual movement only to and fro the rigid fastener (19), whereas the four-way fastener (27) allows mutual movement to and fro both of the two-way fasteners (20, 22).

8 Claims, 4 Drawing Sheets

COOLING MODULE WITH HEAT EXCHANGERS IN BACK-TO-FRONT RELATIONSHIP

TECHNICAL FIELD

The present invention relates to a cooling module, comprising a first heat exchanger having a first heat exchange core, which is placed between and communicates with a first pair of parallel supporting manifolds, and a second heat exchanger having a second heat exchange core, which is in back-to-front relationship with said first heat exchange core and which is placed between and communicates with a second pair of parallel supporting manifolds perpendicular to said first pair of supporting manifolds, wherein said first pair of supporting manifolds is fastened to said second pair of supporting manifolds at four heat exchanger corners by means of fasteners, the first one of said corners being located at a first end of a first manifold of said pair of first supporting manifolds, the second one of said corners being located at a second end of said first manifold, the third one of said corners being located at a first end of a second manifold of said pair of first supporting manifolds, and the fourth one of said corners being located at a second end of said second manifold and being diametrically opposed to the first corner, and wherein one of said pairs of supporting manifolds is adapted to support the cooling module on a motor vehicle frame.

BACKGROUND OF THE INVENTION

In vehicles having supercharged combustion engines a coolant radiator for cooling the engine and a charge air cooler for cooling the engine intake air are usually mounted in parallel in the vehicle front. Both the coolant radiator and the charge air cooler have an inlet tank or manifold and an outlet tank or manifold and each a tube package or heat exchange core between these manifolds. As the heat exchange cores are perpendicular to each other, the manifolds of the coolant radiator and the charge air cooler are perpendicular too. Thus, if the coolant radiator and the charge air cooler are of similar size, there are four corners where the manifolds overlap or are in close relation to one another. Interconnection of the manifolds at these corners, as stated by way of introduction, means creating a cooling module, which considerably facilitates vehicle assembly. A cooling module of that kind is known from DE 100 18 001 C2.

According to DE 100 18 001 C2 the coolant radiator is vertically arranged with the inlet manifold on top and the outlet manifold at the bottom, whereas the charge air cooler is arranged horizontally with its manifolds in an upright vertical position. The upright manifolds have projecting arms at their ends making the charge air cooler fit the coolant radiator and enabling easy assembly of the two by means of fasteners. The bottom ones of these fasteners connect the downwardly extending arms in a rigid way with the coolant radiator and the top ones connect the upwardly extending arms with the coolant radiator in a floating way in order to compensate for either core's thermal expansion.

OBJECT OF THE INVENTION

A first drawback of the prior art solution according to DE 100 18 001 C1 is that the four extending arms on the cooler manifolds render the charge air cooler heavier as well as more complicated and expensive than an ordinary charge air cooler. A second drawback is that there are no means provided to compensate for thermal expansion at the downwardly extending arms with their rigid fasteners. This means that the integrity of either the charge air cooler or the bottom manifold of the coolant radiator is endangered when big differences in thermal expansion are at hand. A third drawback is that the floating mount of both the upwardly extending arms can lead to vibrations from the vehicle frame, to which the charge air cooler is bolted, making the coolant radiator top swing out of phase with the charge air cooler, which is detrimental to the long-time integrity of the cooling module due too fatigue problems.

The object of the invention is to obviate the prior art drawbacks.

SUMMARY OF THE INVENTION

According to the invention this is done by means of a cooling module as described by way of introduction, characterised by that a rigid fastener is provided at said first corner, that a first two-way fastener is provided at said second corner allowing mutual movement of the heat exchangers at said second corner only to and fro said rigid fastener, that a second two-way fastener is provided at said third corner allowing mutual movement of the heat exchangers at said third corner only to and fro said rigid fastener, and that a four-way fastener is provided at said fourth corner allowing mutual movement of the heat exchangers at said fourth corner to and fro said first two-way fastener and said second two-way fastener.

By appropriate mutual sizing of both heat exchangers and direct interconnection of their manifolds by means of suitable fasteners, lighter and less complicated and thus less expensive heat exchangers can be used. Further, by using just one rigid fastener the problems with thermal expansion are obviated, because the remaining fasteners provide the necessary compensation. And by carefully designing the three non-rigid fasteners and giving them defined directions of work, the prior art vibration problems are at least mitigated, because the heat exchangers according to the invention always are forced to swing in phase.

Preferably said rigid fastener is a bolt extending through sleeves in the manifolds at said first corner. This is obviously the most simple and assembly friendly solution, and yet a very reliable one.

The first two-way fastener is preferably a bracket, attached to the manifolds at said second corner and having a flexing part between the attachment points at the manifolds. Such a bracket can be an easy to make sheet metal piece, said flexing part being a part thereof which is adapted to be bent in a limited extent to and fro the rigid fastener and yet capable of vertically supporting the weight of a heat exchanger without any yielding.

The second two-way fastener is preferably a retainer clip extending over and holding together flanges on the manifolds at said third corner, wherein one of said flanges has a pin extending into a movement restricting oblong hole in the other flange. Furthermore, the four-way fastener is preferably too a retainer clip extending over and holding together flanges on the manifolds at said fourth corner. As the heat exchangers are adequately supported at two corners by the rigid fastener and the first two-way fastener, simple and easy to mount clips suffice at the remaining corners to join the heat exchangers in a safe way. However, the pin cooperating with the oblong hole at the third corner is vital, because of the necessity according to the invention to limit mutual movement of the heat exchangers at that corner.

According to one embodiment the first heat exchanger is a coolant radiator with a hot inlet manifold and a cold outlet manifold and the second heat exchanger a charge air cooler with a hot inlet manifold and a cold outlet manifold, the first corner with the rigid fastener being the one common to both cold outlet manifolds. This embodiment is most suited for vehicles where the charge air cooler supports the coolant radiator from below, such that the top of the coolant radiator is free to expand upwards.

According to another embodiment the first heat exchanger is a coolant radiator with a hot top inlet manifold and a cold bottom outlet manifold and the second heat exchanger a charge air cooler with a hot first side inlet manifold and a cold second side outlet manifold, the charge air cooler manifolds being adapted to support the cooling module on said motor vehicle frame, and said first corner with the rigid fastener being located at said cold second side outlet manifold. This embodiment is most suited for vehicles where the charge air cooler supports the coolant radiator in a hanging manner, such that the bottom part of the coolant radiator is free to expand downwards.

It is obvious to the one skilled in the art that either pair of manifolds may be adapted to support the cooling module on said motor vehicle frame, and that, if one of the heat exchangers is a charge air cooler, the charge air cooler manifolds preferably are adapted to support the cooling module on said motor vehicle frame.

BRIEF DESCRIPTION OF THE DRAWINGS

A preferred embodiment of the invention is described in detail in below with reference to the drawings, in which identical reference numbers depict identical parts.

In the drawings.

DESCRIPTION OF A PREFERRED EMBODIMENT

Figure 1:
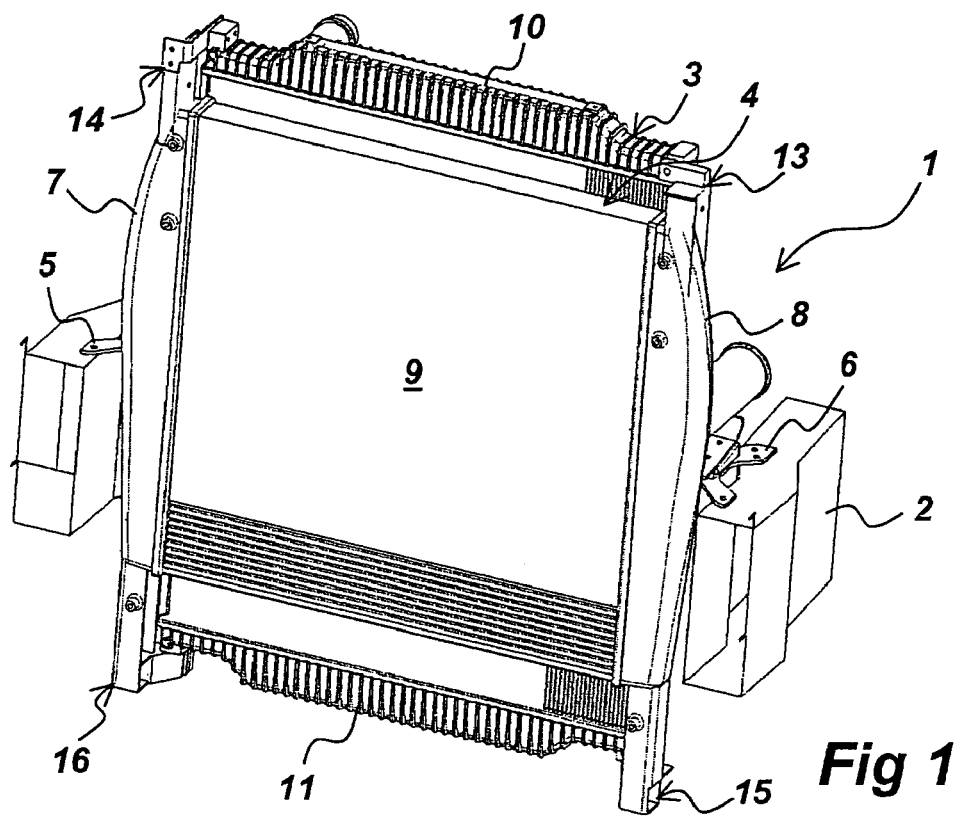
FIG. 1 is a front perspective view of a cooling module according to the invention.
Figure 2:
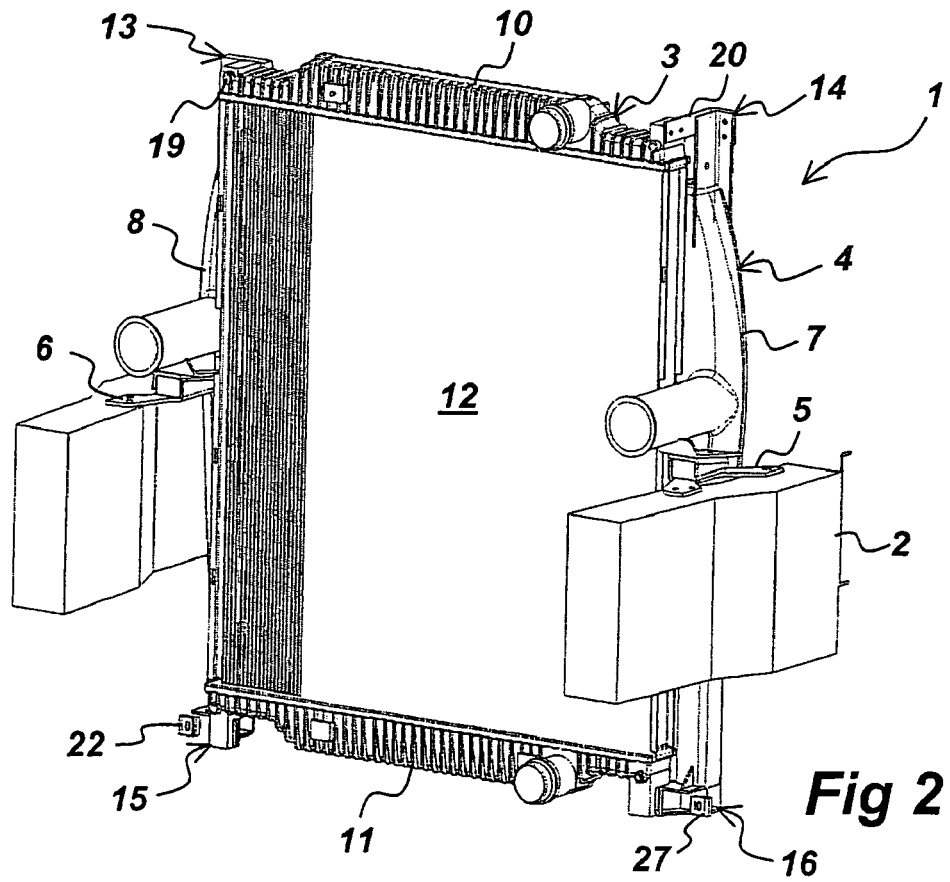
FIG. 2 is a rear perspective view of the cooling module.

In FIGS. 1 and 2 a preferred embodiment of a cooling module 1 is shown, adapted to be mounted on a frame 2 of a truck (not shown), which is driven by a supercharged diesel engine. The cooling module 1 comprises a coolant radiator 3 for cooling coolant heated by the diesel engine and a charge air cooler 4 for cooling supercharged air before the air is fed into the diesel engine. The charge air cooler 4 is mounted in front of and in parallel with the coolant radiator 2 and supports the whole cooling on the truck frame by means of a pair of anti-vibration mounts 5, 6.

The anti-vibration mounts 5, 6 are attached to a hot first side inlet manifold 7 of the charge air cooler 4 and a cold second side outlet manifold 8 of the charge air cooler 4, respectively, both manifolds 7, 8 being vertically arranged. Between the manifolds 7, 8 there is a rectangular tube package or core 9, which is tightly connected to both manifolds 7, 8 and accomplishes the actual cooling of the supercharged air.

The coolant radiator 3 also has manifolds. These are however horizontally arranged and comprise an hot top inlet manifold 10 and a cold bottom outlet manifold 11. Again, between the manifolds 10, 11 there is a rectangular tube package or core 12, which is tightly connected to both manifolds 10, 11 and accomplishes the actual cooling of the engine coolant.

As can be seen clearly in FIGS. 1 and 2, the cooling module 1 defines four corners. The first one of these corners is depicted 13 and is located at a first end of the cold second side outlet manifold 8 of the charge air cooler 4 and a first end of the hot top inlet manifold 10 of the coolant radiator 3, respectively, said ends overlapping one another. The second one of said corners is depicted 14 and is located at a first end of the hot first side inlet manifold 7 of the charge air cooler 4 and a second end of the hot top inlet manifold 10 of the coolant radiator 3, respectively, said ends overlapping one another. The third one of said corners is depicted 15 and is located at a second end of the cold second side outlet manifold 8 of the charge air cooler 4 and a first end of the cold bottom outlet manifold 11 of the coolant radiator 3, respectively, said ends overlapping one another. The fourth one of said corners is depicted 16 and is located at a second end of the hot first side inlet manifold 7 of the charge air cooler 4 and a second end of the cold bottom inlet manifold 11 of the coolant radiator 3, respectively, said ends also overlapping one another.

Figure 3:
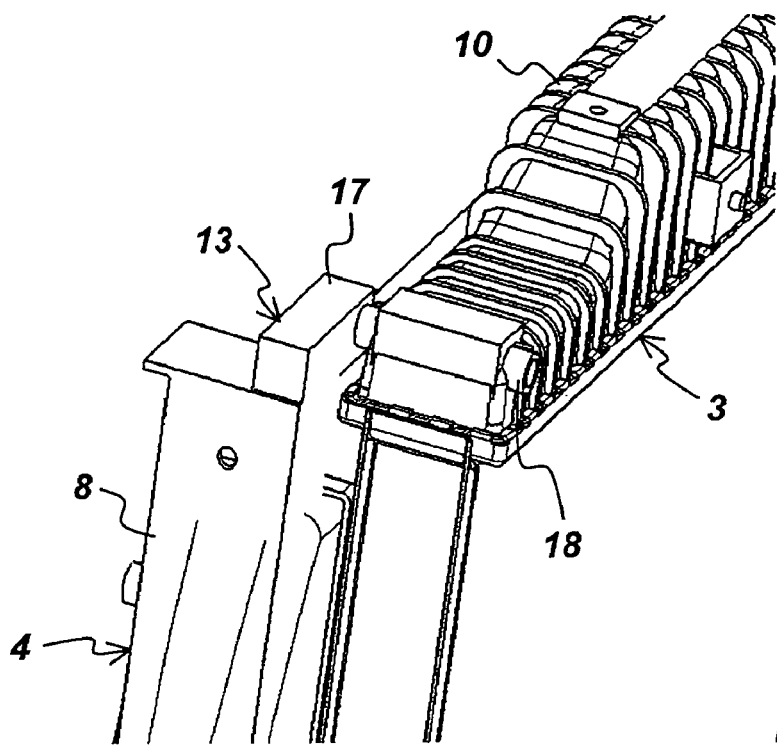
FIG. 3 is a top perspective view of a first corner of the cooling module.

At the first corner 13, which is shown in detail in FIG. 3, each manifold 8 and 10 has its own sleeve 17, 18, through which a bolt 19 (c.f. FIG. 2) extends, holding the manifolds 8, 10 firmly together and thus defining a rigid fastener.

Figure 4:
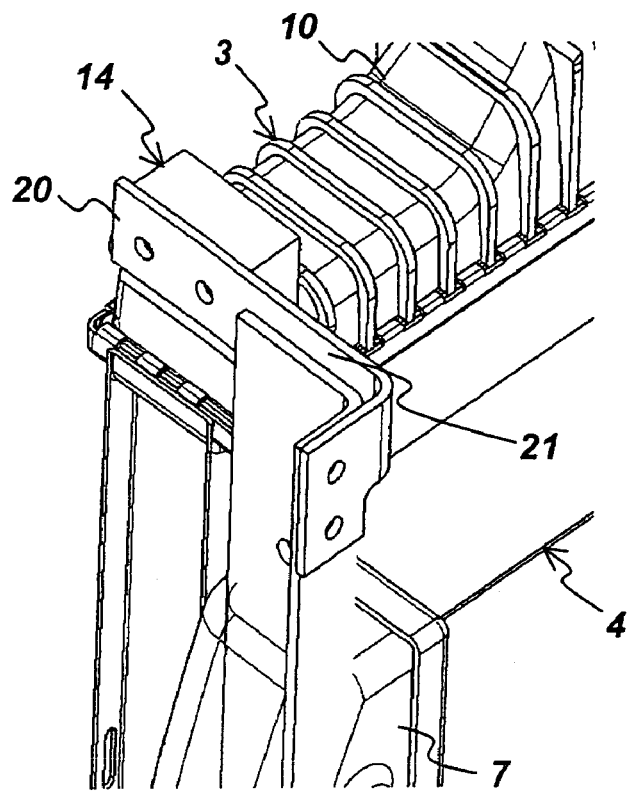
FIG. 4 is a top perspective view of a second corner of the cooling module.

At the second corner 14, which is shown in detail in FIG. 4, a bracket 20 of sheet metal is attached to the manifolds 7, 10 at the second corner 14. The bracket 20 has a flat central flexing part 21 between the attachment points at the manifolds 7, 10, said part 21 lying in a vertical plane perpendicular to the coolant radiator 3 and the charge air cooler 4. Thus the bracket 20 defines a first two-way fastener, allowing mutual movement of the coolant radiator 3 and the charge air cooler 4 at the second corner 14 only to and fro the rigid fastener 19 at the first corner 13, wherein the inherent resistance to flexing of part 21 advantageously counteracts degrading vibrations.

Figure 5:
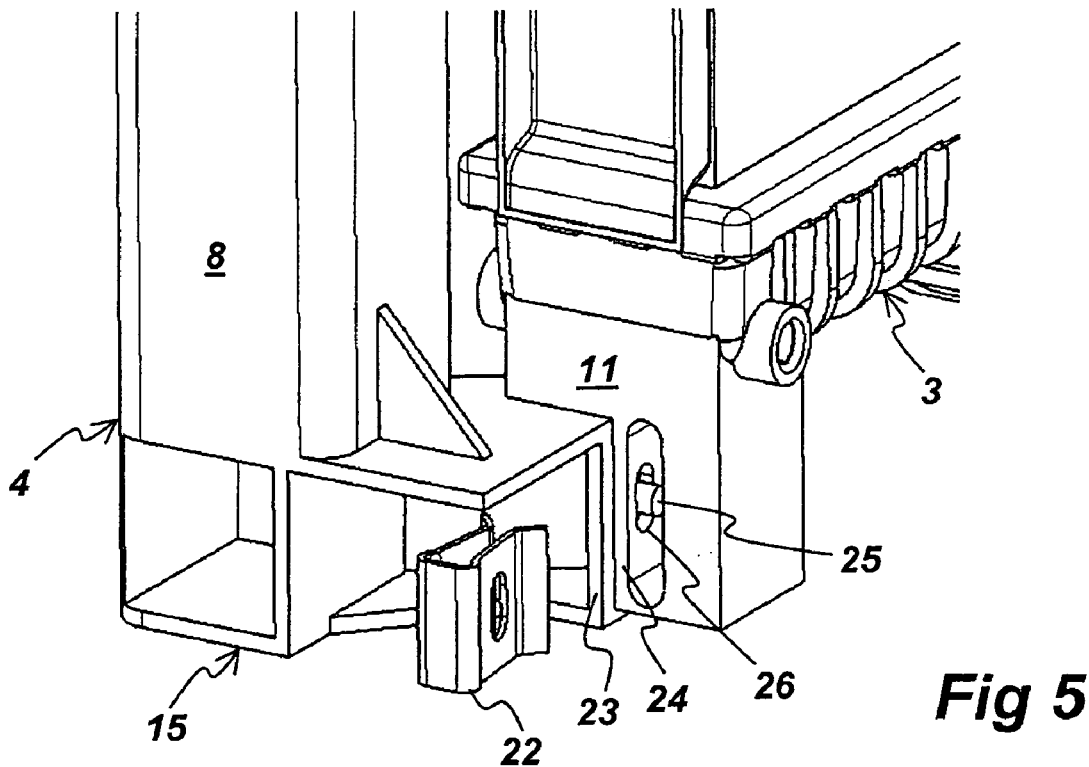
FIGS. 5 and 6 are a bottom perspective views of a third corner of the cooling module prior to and after assembly.
Figure 6:
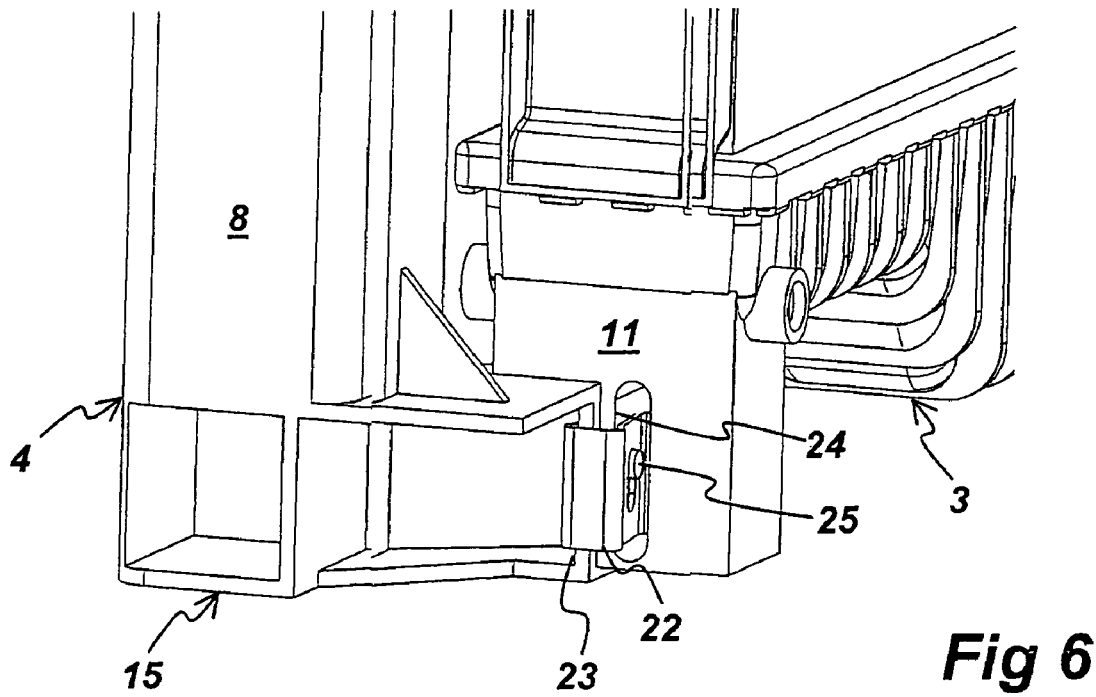

At the third corner 15, which is shown in detail in FIGS. 5 and 6, a flexible metal clip 22 (shown in FIG. 5 before and in FIG. 6 after attachment) is used to interconnect the manifolds 8 and 11. In order to render that possible each one of these manifolds 8 and 11 has a flange 23 and 24, respectively, the flanges 23, 24 abutting one another and lying in a plane parallel to the coolant radiator 3 and the charge air cooler 4. The flange 24, pertaining to the manifold 7, has a pin 25 extending into an oblong hole 26 in the opposite flange 23. The pin 25 and the oblong hole 26 serve to restrict mutual movement of the coolant radiator 3 and the charge air cooler 4 at the third corner 15 to movement only to and fro the rigid fastener 19 at the first corner 13, wherein friction between the flanges 23, 24 also helps counteracting degrading vibrations. Thus the clip 22, together with the pin 25 and the oblong hole 26, defines a second two-way fastener controlling mutual manifold movement at the third corner 15.

Figure 7:
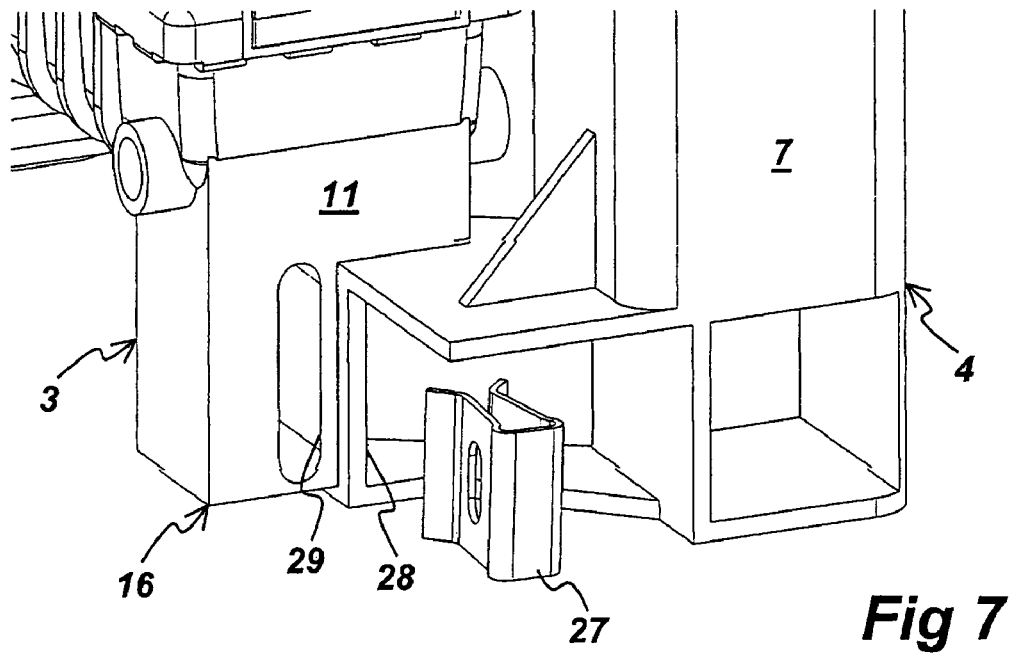
FIGS. 7 and 8 are bottom perspective views of a fourth corner of the cooling module prior to and after assembly.
Figure 8:
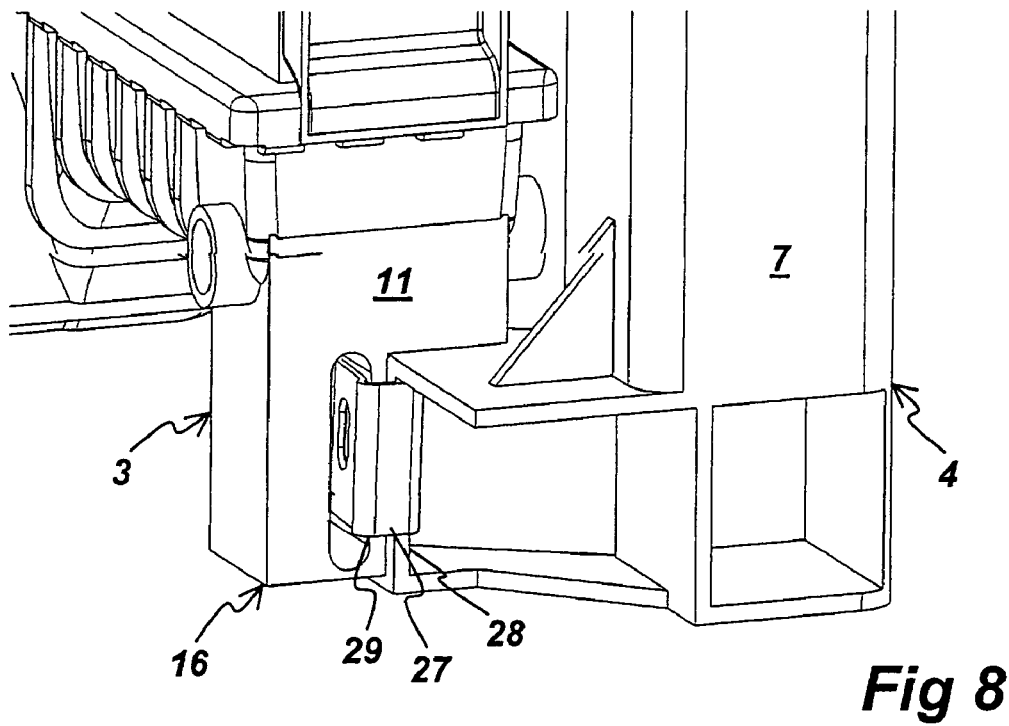

At the fourth corner 16, which is shown in detail in FIGS. 7 and 8, a flexible metal clip 27 (shown in FIG. 7 before and in FIG. 8 after attachment) is used to interconnect the manifolds 7 and 11. Again each one of these manifolds 7 and 11 has a flange 28 and 29, respectively, the flanges 28, 29 abutting one another and lying in a plane parallel to the coolant radiator 3 and the charge air cooler 4. Unlike the arrangement at the third corner 15, there is no extra movement restricting means at the fourth corner 16, however, friction between the flanges 28, 29 again helps counteracting degrading vibrations. Thus the clip 27 defines a four-way fastener allowing mutual manifold movement at the fourth corner 16 to and fro both the first and second two-way fasteners, i.e. both vertically and horizontally in a plane parallel to the coolant radiator 3 and the charge air cooler 4.

It is obvious to the one skilled in the art that the referred embodiment described above can be altered in different ways in order to accomplish adaptation to a certain vehicle. However, at present the preferred embodiment, comprising rigidly connecting the cold outlet manifold of the charge air cooler, which is exposed to the most prominent heat distortion, to the hot inlet manifold of the coolant radiator, which is less exposed to such distortion, at a top corner of the cooling module, is believed to be the most convenient one in view of vehicle assembly and long-time durability.

The invention claimed is:

1. A cooling module (I), comprising
   a first heat exchanger (3) having a first heat exchange core (12), which is placed between and communicates with a first pair of parallel supporting manifolds (10, 11), and
   a second heat exchanger (4) having a second heat exchange core (9), which is in back-to-front relationship with said first heat exchange core (12) and which is placed between and communicates with a second pair of parallel supporting manifolds (7, 8) perpendicular to said first pair of supporting manifolds (10, 11),
   wherein said first pair of supporting manifolds (10, 11) is directly interconnected with said second pair of supporting manifolds (7, 8) at four heat exchanger corners (13, 14, 15, 16) by means of fasteners,
   the first one (13) of said corners being located at a first end of a first manifold (10) of said pair of first supporting manifolds (10, 11),
   the second one (14) of said corners being located at a second end of said first manifold (10),
   the third one (15) of said corners being located at a first end of a second manifold (11) of said pair of first supporting manifolds (10, 11), and
   the fourth one (16) of said corners being located at a second end of said second manifold (11) and being diametrically opposed to the first corner (13),
   wherein one of said pairs of supporting manifolds (7, 8; 10, 11) is adapted to support the cooling module (1) on a motor vehicle frame (2),
   wherein a rigid fastener (19) is provided at said first corner (13) forcing the heat exchangers (3, 4) always to swing in phase,
   a first two-way fastener (20) is provided at said second corner (14) allowing, for thermal compensation, mutual movement of the heat exchangers (3, 4) at said second corner (14) only to and fro said rigid fastener (19),
   a second two-way fastener (22) is provided at said third corner (15) allowing, for thermal compensation, mutual movement of the heat exchangers (3, 4) at said third corner (15) only to and fro said rigid fastener (19), and
   a four-way fastener (27) is provided at said fourth corner (16) allowing, for thermal compensation, mutual movement of the heat exchangers (3, 4) at said fourth corner (16) to and fro said first two-way fastener (20) and said second two-way fastener (22).

2. A cooling module according to claim 1, wherein said rigid fastener is a bolt (19) extending through sleeves (17, 18) in the manifolds (8, 10) at said first corner (13).

3. A cooling module according to claim 1 or 2, wherein said first two-way fastener is a bracket (20), attached to the manifolds (7, 10) at said second corner (14) and having a flexing part (21) between the attachment points at the manifolds (7, 10).

4. A cooling module according to claim 1 wherein said second two-way fastener is a retainer clip (22) extending over and holding together flanges (23, 24) on the manifolds (8, 11) at said third corner (15), wherein one of said flanges (23) has a pin (25) extending into a movement restricting oblong hole (26) in the other flange (24).

5. A cooling module according to claim 1 wherein said four-way fastener is a retainer clip (27) extending over and holding together flanges (28, 29) on the manifolds (7, 11) at said fourth corner (16).

6. A cooling module according to claim 1 wherein said first heat exchanger is a coolant radiator (3) with a hot inlet manifold (10) and a cold outlet manifold (11) and said second heat exchanger is a charge air cooler (4) with a hot inlet manifold (7) and a cold outlet manifold (8), the first corner with the rigid fastener (19) being the one common to both cold outlet manifolds (8, 11).

7. A cooling module according to claim 1 wherein said first heat exchanger is a coolant radiator (3) with a hot top inlet manifold (10) and a cold bottom outlet manifold (11) and said second heat exchanger is a charge air cooler (4) with a hot first side inlet manifold (7) and a cold second side outlet manifold (8), the charge air cooler manifolds (7, 8) being adapted to support the cooling module (I) on said motor vehicle frame (2), and said first corner with the rigid fastener (19) being located at said cold second side outlet manifold (8).

8. A cooling module according to claim 1 wherein one of the heat exchangers is a charge air cooler (4) and wherein the charge air cooler manifolds (7, 8) are adapted to support the cooling module (1) on said motor vehicle frame (2).

* * * * *